United States Patent [19]

Taranto et al.

[11] Patent Number: 4,740,740
[45] Date of Patent: Apr. 26, 1988

[54] METHOD AND APPARATUS FOR THE AUTOMATIC CONNECTION OF BATTERY CABLES

[76] Inventors: James Taranto, 736 Lincoln St., Waltham, Mass. 02154; James H. Cullen, 5 Evans Ave., Bedford, Mass. 01730

[21] Appl. No.: 921,924

[22] Filed: Oct. 20, 1986

[51] Int. Cl.⁴ .............................................. H02J 7/00
[52] U.S. Cl. ...................................... 320/26; 439/504
[58] Field of Search ................ 320/2, 25, 26; 439/504

[56] References Cited

U.S. PATENT DOCUMENTS

4,238,722 12/1980 Ford ..................................... 320/25
4,463,402 7/1984 Cottrell ............................ 320/25 X Primary Examiner—R. J. Hickey
Attorney, Agent, or Firm—Robert K. Tendler

[57] ABSTRACT

A method and apparatus for the automatic connection of battery cables to eliminate spark or other undesirable effects from misconnection includes apparatus for sensing the polarity of the batteries to which the cables are attached and for automatically switching the connection cables so that the polarities are matched. Other portions of the circuit inhibit charging if one of the clamps becomes disconnected from a battery post or if a battery is below a predetermined small voltage indicating either an unchargeable battery or a disconnected cable condition. A specialized battery cable clamp is provided in which one set of jaws is insulated from the other, with a standoff preventing the jaws from touching each other. Once predetermined conditions have been met and the sense of the terminals on each of the batteries has been periodically ascertained, the main switching relays are activated so as to connect the appropriate main battery cables from one battery to another.

6 Claims, 5 Drawing Sheets

METHOD AND APPARATUS FOR THE AUTOMATIC CONNECTION OF BATTERY CABLES

FIELD OF THE INVENTION

This invention relates to battery cables and more particularly to a method and apparatus for eliminating sparking or other undesirable effects when one battery is connected by jumper cables to another battery.

BACKGROUND OF THE INVENTION

The jumping of batteries via the use of jumper cables has been known in the past in which one battery is charged via another battery through the utilization of jumper cables which carry large currents. One of the problems with the utilization of such cables is the possibility of polarity reversal which causes a large amount of sparking that is both frightening and can, in fact, ignite some of the battery gases or other flammable materials within the engine compartment should the polarity be reversed when the cables are connected. While those skilled in the utilization battery cables, including auto mechanics and the like, have very little difficulty in ascertaining the polarity of batteries and whether or not a battery is capable of being charged, the utilization of battery cables by those not skilled in battery cable interconnection has resulted in either the non-use of battery jumper cables or the incorrect use of the cables which, at the very least, does not result in the proper battery being charged from a presumably "good" battery.

This situation is made more complicated and mistakes can be made because when batteries are in most need of charging, it is usually in cold weather or in the pouring rain, in which mistakes can be made due to the inclement conditions under which most battery jumping occurs. Also, dirt on, or corrosion of wires and terminals may be so great that the polarity of the battery to be charged cannot be easily ascertained. If the batteries are misconnected, the battery may overheat and even explode which can shower people with sulfuric acid. Moreover, highly explosive hydrogen gas is released from the car battery and can be ignited, in some instances, by a single spark.

There is, therefore, a need a for the sensing of the polarity of both batteries, ensuring that at least one of the batteries has sufficient charge to charge the bad battery, and also ensuring that the bad battery is not discharged so low that it is a risk to charge. There is therefore need for a system which ascertains when all of the conditions for proper charge have been met, and then to properly connect the batteries together. Thus, there is a necessity for an automatic jumper cable system which ascertains all of the above conditions and only connects the batteries together under an appropriate set of conditions. Moreover, the system must protect against inadvertently shorting the jaws of the cable clamps together which causes a rain of sparks that automatically discharges either one or both of the batteries. This is a frequenct situation since the battery jaws common on most jumper cables have exposed electrically conductive elements.

SUMMARY OF THE INVENTION

In order to alleviate such problems, a method and apparatus is utilized in which the battery cables emanate from a central processing unit which includes heavy duty main relays which are under the control of the system so that the charging process may automatically proceed assuming appropriate polarity has been established or to switch the cable polarity prior to any charging, such that sparks and misconnection effects are completely eliminated. When, for instance, a cable set "A" is attached to an automobile battery "A" of one vehicle, whether it is to be charged or discharged and regardless of the voltage polarity, the subject device permits the corresponding logic, switching and detection circuitry to go into operation. The unit will not go into operation unless there is sufficient battery power in one or the other of the batteries to operate the system and thus, in one embodiment, the system will not operate unless such battery voltage exists at the battery terminals of one or the other of the batteries. The subject system then identifies the incoming voltage polarity, detects its voltage level and correctly sets the power switching relays for polarity matching. In one embodiment, it is assumed that one of the automobile batteries from either of the vehicles is always fully charged; although in a second embodiment, this condition is checked before the battery charging operation is allowed to continue.

Upon activation of the correct main power transfer devices or main switching relays, the system establishes electrical conductivity between the cable set "A" and the cable set "B" automatically and correctly. This then permits proper electrical transfer between both vehicle batteries. It will be appreciated that if the reverse situation is true, where battery "B" is to charge battery "A", that the subject circuit is bidirectional in the sense that it will work in either direction to prevent sparking and misconnection.

In another embodiment, disconnection of any one of the cables is sensed which deactivates the unit and puts it in a reset mode, thereby to separate cable set "A" from cable set "B". This prevents electrical power transfer between the vehicle batteries. The result is that there is absolutely no possibility of sparking or short-circuiting between the cables themselves. It also permits a person with little or no understanding of the correct connection of battery cables to connect them safely and correctly each and every time they are used. There is no possibility of damage to the automobile electrical systems resulting from interconnection and the subject system saves time as it eliminates the need for ascertaining battery polarity by virtue of corresponding color coordination markings or keyed or coded connection devices. Moreover, it eliminates the need of external light sources to identify colors and markings of keyed or coded connection devices under poor visibility or inclement weather.

It will be appreciated that there have, in fact, been so-called "safe" jumper cables in which a light emitting diode indicates when proper battery hook up is achieved with the cables. A polarized central connector is then utilized which, only after the each proper LED is lit, permits the joining of the cable sections and this connection is done away from the potentially explosive battery fumes.

However, this type of cable assembly available from Colbrese Cable Connection Corp. of Homewood, Ill., is not automatic in any sense; but, rather, merely through the use of a light emitting diode or other device indicates the polarity prior to the interconnection of the cable pair halves. The device requires some training on the part of the individual and again is not fail-safe in the above mentioned sense. More particularly, one must observe the LED readouts in order to obtain an indication at all times prior to connection whether or not proper connection from one battery to the other can be made. It does not indicate the condition of either of the batteries or whether or not one or the other of the batteries can, in fact, be charged. It also cannot detect if one or more of its cable clamps have been disconnected. It will be appreciated that some batteries when run down may actually take on a slight polarity reversal which indicates an unchargeable battery condition.

In summary, a method and apparatus for the automatic connection of battery cables to eliminate spark or other undesirable effects from misconnection includes apparatus for sensing the polarity of the batteries to which the cables are attached and for automatically switching the connection cables so that the polarities are matched. Other portions of the circuit inhibit charging if one of the clamps becomes disconnected from a battery post or if a battery is below a predetermined small voltage indicating either an unchargeable battery or a disconnected cable condition. A further circuit coupled to a power bridge powers the subject device and also, with a power-up timer, inhibits the connection of the two batteries together via the cables if, in one embodiment, either of the batteries is at less than 10 volts. If either one of the batteries is at greater than 10 volts, the system is inhibited for, a predetermined period of time prior to actuation to permit system stabilization. A specialized battery cable clamp is provided in which one of the jaws is insulated from the other, and with a standoff, the two jaws are prevented from touching each other. In one embodiment, one of the jaws carries a sense cable, with the other jaw carrying a power and main cable. The sense cables are utilized in a sampling system which first samples the polarity of one of the battery terminals and stores it on a capacitor at which point the other battery terminals are coupled to the capacitor with the capacitor being read out to a comparator during the switching operation so that the polarities of the batteries are ascertained assuming the other criteria have been met vis-a-vis chargeability and battery voltage. Once all of the above conditions have been met and the sense of the terminals on each of the batteries has been ascertained, the main switching relays are activated so as to connect the appropriate main battery cables from one battery to another. This system, therefore, provides a complete anti-spark jumper cable system in which either frightening or potentially dangerous sparks are eliminated.

BRIEF DESCRIPTION OF THE DRAWINGS

These and other features of the subject invention will be better understood in connection with the Detailed Description taken in conjunction with the Drawings, of which.

DETAILED DESCRIPTION

Figure 1:
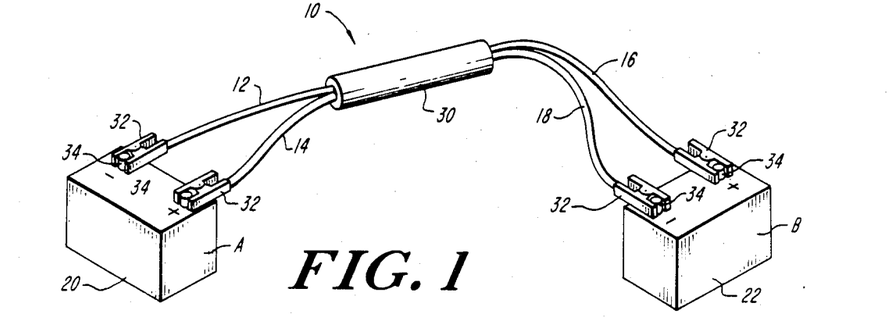
FIG. 1 is a diagrammatic representation of the utilization of the subject device to charge one battery from another battery.

Referring now to FIG. 1, a system 10 involving jumper cables 12, 14, 16 and 18 are utilized to connect a battery 20, generally designated "A", with a battery 22, generally designated "B". The inter-connection of these two batteries for the purpose of charging one or the other is controlled through the use of a unit 30 which in general is utilized to sense the polarity of the batteries in question and to provide that the polarity between the various battery cable leads 12–18 are correct such that one battery may charge the other battery. Each of the leads, in the subject invention is provided with a specialized battery clamp 32 which will be described more particularly in connection with FIG. 3, with the battery clamp providing for not only the inter-connection of the batteries so that one may charge the other, but also the sensing of a dropped clamp, a shorted clamp or even a battery which cannot be charged either because its charge is too low or because it, in fact, has a reverse charge which has developed on its terminals, here illustrated at 34.

The purpose of the subject device is to eliminate spark or other undesirable effects due to the misconnection or shorting out of the batteries during a battery jumping process which utilizes jumper cables.

Figure 2A:
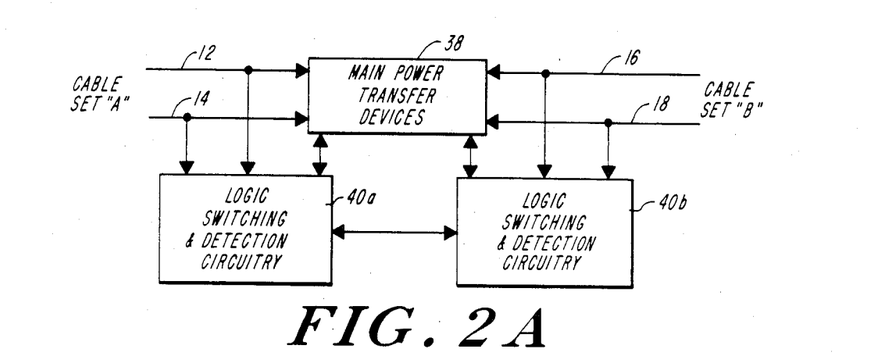
FIG. 2A is a block diagram illustrating, in general, the utilization of logic and switching circuits along with main power transfer devices to be able to sense and correct for polarity differences between the batteries utilized in the charging or jumping process.

Referring to FIG. 2A, cable set "A", including cables 12 and 14, are shown connected to main power transfer devices 38 which, in one embodiment, couple power from cable set "A" to cable set "B", i.e. cables 16 and 18, either with the original polarity, if such is determined to be correct by unit 30 of FIG. 1, or with switched polarity, such that the polarity of a given cable pair from one battery to another is automatically corrected as opposed to being reversed. The main power transfer devices are, in general, relays which will be discussed in connection with FIG. 2B and are switched in accordance with logic switching and detection circuitry 40a or 40b which senses the polarity of the battery to which the respective cables are connected. The logic circuits determine whether or not the polarities are compatible and control the main power transfer devices so as to establish the correct polarity between the two batteries, thereby avoiding the aforementioned sparking and other damage to sensitive electrical components should a reverse polarity charge be transmitted throughout out the automative electrical system.

While the initial intent of the apparatus of FIG. 2A is to initially sense battery polarity and to rearrange the wiring of the cables so as to match the polarities thereby preventing sparking and other damage, it is also of interest, as mentioned above, to sense whether or not a battery can in fact be charged, whether ther is a dropped clamp or a shorted clamp; or whether the battery is in such a condition as to allow the charging from one to the other. It will be appreciated that the subject circuit operates completely automatically without the user having to be aware of its operation as has sometimes been the case in terms of looking at light emitting diodes to determine polarity prior to hook-up. These prior types of systems, as mentioned before, are cumbersome and are subject to misuse by those not trained to use them.

Figure 2B:
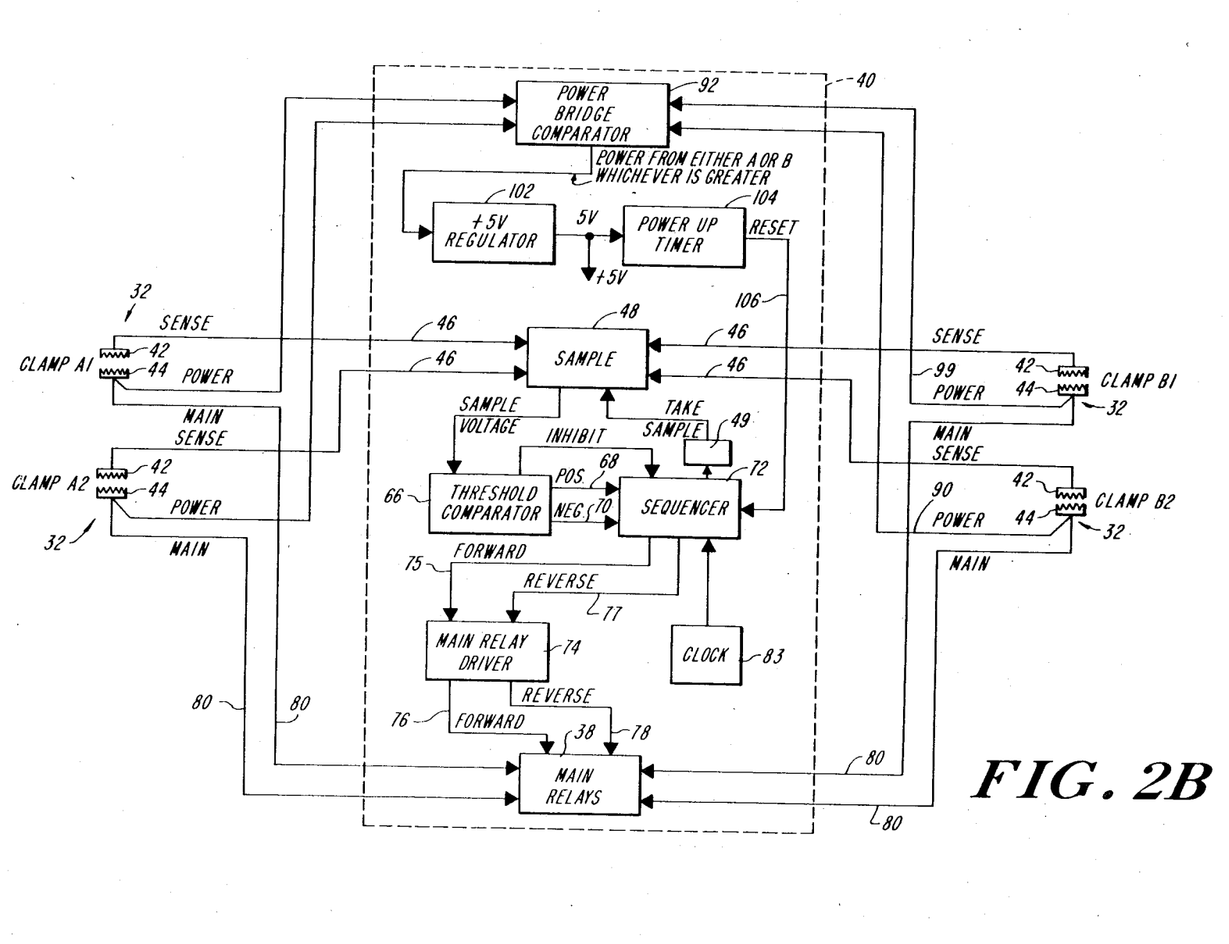
FIG. 2B is a block diagram further illustrating one embodiment of the subject invention in which specialized battery clamps are utilized and in which the status of the batteries, both as to polarity and as to chargeability as well as to whether or not there is a disconnect or short condition, is sensed.
Figure 3:
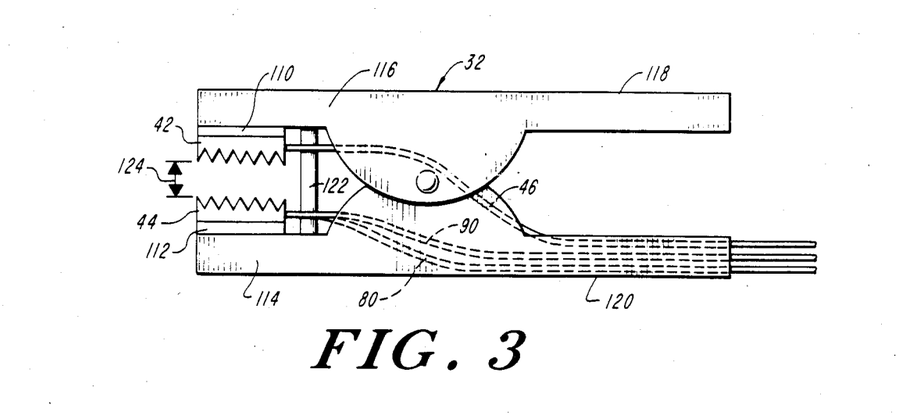
FIG. 3 is a side view and schematic diagram of a specialized battery connector clamp utilized in the subject invention in which the jaws of the clamp are not allowed to physcially touch one another, also showing the sense wire, the power wire and the main heavy cable emanating therefrom.

Referring now to FIG. 2B, one implementation of the logic, switching and detection circuitry 40a and 40b of FIG. 2A to control main power transfer devices such as relays includes specialized clamps, in which the jaws are insulated one from the other as illustrated in FIG. 3. The construction of the clamp which is used with the subject system is described later in FIG. 3. However, with respect to FIG. 2B, each clamp includes two electrically conductive jaws 42 and 44 which are adapted to engage the terminal posts of the respective batteries "A" and "B" and which are never allowed to touch one another so that the functions described hereinafter can be obtained. Attached to each jaw 42 is a sense wire 46 such that four such wires are applied, in one embodiment, to a sampler circuit 48 driven by a sample driver 49 to sample not only the polarity of the battery terminals but also to sense whether a battery has a sufficient charge to enable the charging thereof. The sampling circuit also senses the disconnection of a cable clamp since the sampled voltage will be zero. The method with which sampling occurs can be seen from FIG. 5 in which a capacitor 50 is connected to a double-pole/double-throw relay generally indicated at 52 which is connected by wiper arms 54 first to cable clamps A1 and A2 through a resistor 56 and thence through resistor 58 and back-to-back diodes 60 and 62 to a threshold comparator circuit 66 so that the charge on capacitor 50 is sampled by the comparator circuit. Then the capacitor is connected to cable clamps B1 and B2 via another switching circuit and the charge at the "B" battery is read out of the comparator circuit, or two capacitors may be used as illustrated in FIG. 6.

Referring back to FIG. 2B, threshold comparator 66 functions such that by virtue of the sampling of first one battery and then the other, a comparison is made possible such that if a battery has a positive polarity, there will be a signal on the positive line 68 or if the signal is negative, there will be a signal on the negative line 70 to a sequencer 72 which is comprised of a logic array for saving the polarity and condition of battery "A" and then comparing this polarity to that of "B" and establishing polarity and control of the main relays as well as control of the sampling circuit. Note that there cannot be a signal on lines 68 or 70 simultaneously. Should there be a polarity reversal, this is sensed by the character of the signals on lines 68 or 70 and the main relay driver 74 either causes a forward signal on line 76 or a reverse signal on line 78 to control the main relays either to connect in the initial polarity or to reverse the polarity such that the main power of lines 80 may be coupled together through the main relays 38 to the appropriate jaw of the clamp of the jumper cable. If the threshold comparator senses that the particular battery has less than, for instance, 150 millivolts, then the sequencer 72 is inhibited as indicated by line 82. Alternatively, this condition can be sensed by the lack of a signal on either lines 68 or 70. Line 82 is utilized to illustrate the inhibit function of the threshold comparator which will be described in detail hereinafter. Thus, the sampled voltages from batteries "A" and "B" are passed to the comparator which checks for polarity, either positive or negative, and level, which must be greater than 150 mV. The comparator first passes information about battery "A" and then "B" to sequencer 72 which provides signals over lines 75 and 77 to control the main relay driver 74 while causing the sampler to take repeated samples of the batteries. As can be seen, sequencer 72 is driven by a clock 83 so as to drive, for instance, the double-pole/double-throw relay of FIG. 5. The function of the sequencer and its associated logic array is to save the voltage from the comparator from battery "A", to save the voltage from the comparator of battery "B", to compare the polarity of the voltages of "A" and "B" and to control the main relays. The sequencer is inhibited in its operation if, in one embodiment, the threshold of 150 millivolts, for instance, has not been exceeded by either one of the two batteries during an initial sequence test during power-up. It also senses when either one of the two sensed voltages is zero due to a disconnect condition or when one battery cannot be charged due to a polarity reversal or a very small voltage which can be the case for completely discharged batteries. It will be noted that in completely discharged batteries, if there is a polarity reversal, it will be of a very small voltage magnitude. By inhibiting sequencer 72 for any of the above conditions, safety is maintained such that the main relays 38 are never actuated if the sequencer is inhibited.

Figure 4:
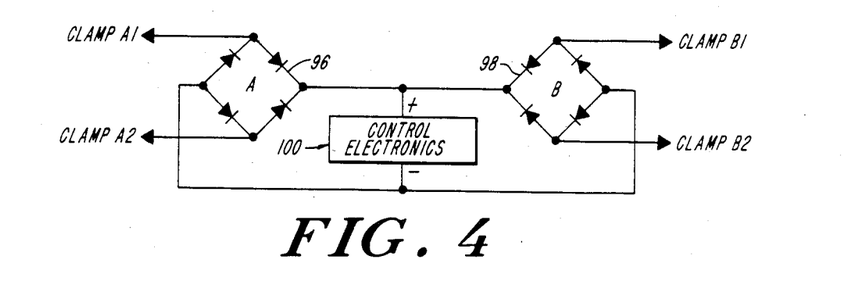
FIG. 4 is a schematic diagram illustrating the power bridge utilized for the powering of the subject device in which power may be obtained from one or the other of the batteries, automatically choosing the battery with the higher or more fully charged condition.

Power for the entire circuit is derived from power lines 90 which are connected to jaws 44 and which are applied to a power bridge comparator 92 which provides power from either battery "A" or battery "B", whichever is greater. Bridge comparator is shown in FIG. 4 to contain diode bridge circuits 96 and 98 coupled to control electronics generally indicated by reference character 100 to be the system electronics. It is a property of such a double bridge circuit that a regulated 5 volts is applied from one battery to the remaining circuitry depending on which has the higher voltage. As shown in FIG. 2B, a voltage regulator 102 takes the voltage from the power bridge comparator 92 and provides it not only to the remainder of the circuitry as a 5 volt signal, but also to a power-up timer 104 which, after a predetermined length of time activates the sequencer. A signal from the power-up timer thus indicates a solid power source, resets sequencer 72, and this, in effect, turns the system on should there be sufficient voltage in either one of the batteries. In one embodiment, this voltage is 10 volts which is dropped to 8 volts by the power bridge comparator such that if neither battery has a 10 volt charge on it, the entire system will be shut down because there will be no signal provided over line 106.

Thus, the power-up circuit initially determines that there is enough voltage from one of the two batteries to proceed. If the voltage is, for instance, under 10 volts, then there will be no output from the voltage regulator which, in one embodiment, is a 5 volt voltage regulator that inhibits the power-up timer which inhibits the actuation of sequencer 72 which then inhibits the operation of the main relays. In summary, with respect to the output of the power-up timer, if the "A" or "B" battery is less than 10 volts, then the entire system is inhibited; whereas, if the voltage from the "A" or "B" battery is greater than 10 volts in one embodiment for, for instance, one second, then the sequencer is activated which activates the system.

After the power-up sequence, should the polarity be appropriate as determined by the threshold comparator and sequencer, then the main relays connect the sets of jumper cables together as originally configured. Should there be a reversal in polarity as sensed via the threshold comparator and sequencer, then the main relays are reversed and the charging process is allowed to continue. The situations in which the charging is made to stop is that one of the two batteries does not have a sensed voltage of any polarity which is above a predetermined very low minimum such as 150 millivolts or in which one of the battery cable clamps becomes disconnected or shorts with another battery cable clamp at which point the threshold voltage will not be exceeded and the sequencer 72 will be inhibited, thereby inhibiting the main relays from connecting the two battery cables together so that the charging procedure is inhibited.

Figure 5:
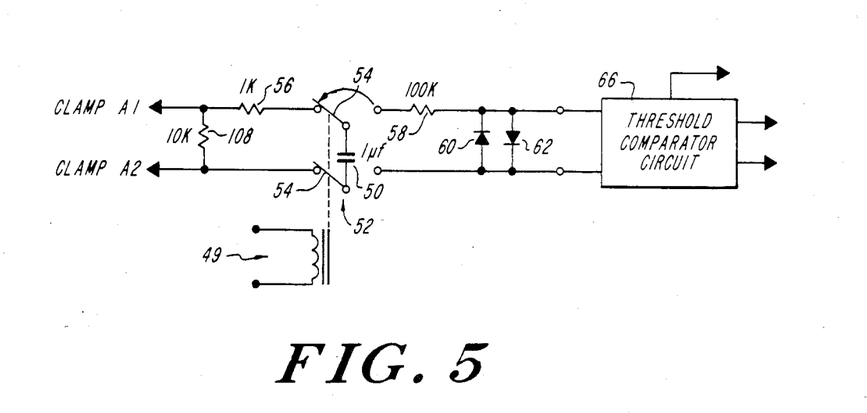
FIG. 5 is a schematic diagram illustrating a sampling circuit utilized to sample the polarity and condition of either of the two batteries in order to obtain information as to the chargeability and polarity of the batteries on a sequential basis.
Figure 6:
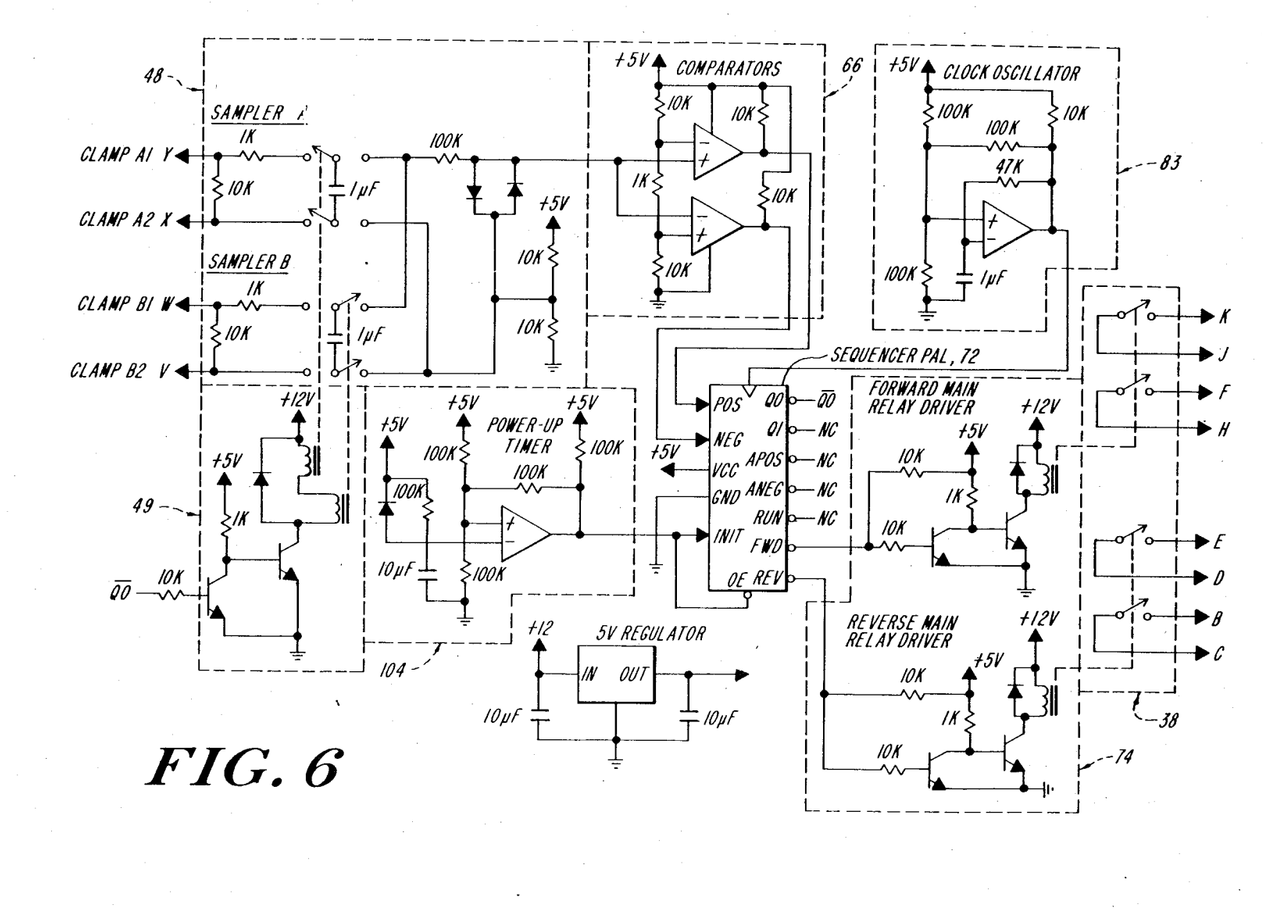
FIG. 6 is a detailed schamatic diagram of the control electronics portion of the circuit of FIG. 2B and FIG. 4 indicating the sampling device and the utilization of comparators along with a sequencer circuit and a forward main relay driver and a reverse main relay driver to control the main relays.

Referring to FIG. 5, it will be noted that there is a resistor 108 across the battery cables, the battery voltage of which is sensed which, in combination with the 1K resistor 56 and, the capacator 50 forms a filter circuit which aids in the stability of the entire sensing and control process. Also note that the 10K resistor 108, serves to discharge capacitor 50 in the event that a clamp has been removed from the battery thereby providing zero volts to the threshold comparator. This will be described hereinafter.

Referring now back to FIG. 3, it can be seen that the specialized battery clamp 32 includes the aforementioned two jaws 42 and 44 which are insulated via insulators 110 and 112 from the springloaded and pivoted clamp arms 114 and 116 which have handles 118 and 120 integrally as a part thereof. Sense wire 46 is shown in dotted outline, as are main wire 80 and power wire 90.

It will be appreciated that a standoff 122 is provided such that jaws 42 and 44 never touch and are maintained at a spacing as indicated by arrow 124 which is not particularly critical.

In operation, the sensing clamp jaw 42 provides an inexpensive reliable mechanism for detecting when a cable is connected to a car battery post. A conventional battery cable clamp contains a jaw which, when squeezed and released, will grab onto the car battery post. This jaw has an upper and lower half. Both halves are electrically connected together and to the jumper cable. When the jaw is in a relaxed position and the clamp is not being squeezed, both jaw halves make contact. Subject system does not utilize this type of clamp but rather uses a sensing clamp 32 which has both lower and upper jaw halves 42 and 44 electrically insulated Separate wires are attached to upper and lower halves. The upper half is called the "sense contact" and is used to report to the subject system control electronics whether the clamp is connected to a battery post. The lower half is connected to the main current carrying wire 80 which is used to transfer current from the charged battery to the discharged battery. The lower half is also connected to the power supply wire 90 which is used to supply the power to operate the control electronics. The upper and lower halves of the jaw are never allowed to touch each other and a spacer 122 separates the two halves by a small amount when the jaws are not being squeezed. The reason that the jaw clamps are spaced apart can be seen by the following.

Assuming that the unit has already gone through its decision-making process and has connected both batteries properly together, if one clamp is accidentially removed, the control electronics will be apprised of this by virtue of the clamp. A voltage will still be present on the clamp but not from the battery which was just disconnected, but from the other battery which is still connected by way of its cable. An insulated and spaced sense contact solves the problem. When the clamp is removed, there is no way for voltage from the cable to come in contact with the sense contact so the control electronics is apprised of the disconnection and operates to disconnect the main battery cables. The space is kept at a minimum length such that sufficient force will be applied to the smallest battery post. However, if that clamp is removed from the post, the upper and lower contact will not make contact. An extra wire, the power wire 90, is connected to the lower jaw which is the same as the main current carrying jaw. It is used to supply current to the control electronics under heavy loads. Note that large voltage drops can occur on the main current carrying wires from the high charge currents which can be as much 600 amps. By supplying separate power supply wires, those voltage drops do not affect the control electronics because the current paths are different.

With respect to the bridge comparator mentioned above, the subject unit contains no batteries, with all power being derived from the two car batteries to which the unit is connected. The cables can be connected in any polarity and in any order. Therefore, it is the purpose of the subject unit that the voltage and polarity of both batteries be determined so that the higher of the two voltages is applied to the control electronics and in the correct polarity. The bridge comparator provides an automatic mechanism for applying power properly to the unit control electronics. The subject power bridge comparator chooses which battery has the highest voltage, rectifies the voltage thereby forcing it to be of the correct polarity and applies that voltage to the control electronics.

As can be seen from FIG. 4, there are two bridges 96 and 98 bridge "A" and bridge "B". These are standard bridge rectifying circuits. Regardless of the polarity of the voltage applied to the inputs via the clamps associated with the bridges, the output voltage will always be of a polarity which is the same regardless of the polarity of the batteries to which the cables are attached. The comparator function of this circuit is such that it makes the circuit somewhat different from conventional bridge comparators. If the voltage applied to the respective clamps A1, A2 is higher than the voltage applied to clamps B1, B2, bridge "B" will be forced into a reverse bias condition causing the control electronics to be powered by bridge "A" and the battery connected to clamps A1, A2. The same is true for bridge "B" if the voltage at clamps B1, B2 is greater than the voltage at at clamps A1, A2.

Referring to the aforementioned sampler of FIG. 5, because of circumstances which arise from deriving power to operate the control electronics, it is impossible to connect the control electronics directly to the two batteries without causing a short-circuit. The sampler allows very low voltages, on the order of a 150 millivolts, to be sensed by the control electronics while maintaining total electrical isolation. The sampler utilizes relay 52 and capacitor 50 as its basic sampling mechanism. When the relay is inactive, capacitor 50 is connected to clamps A1 and A2 by way of a 1K resistor 56. Capacitor 50 charges to its final value. Then the relay is activated causing the charged capacitor to be connected to the threshold comparator circuit 66 via an over-voltage clamping circuit, with the clamping circuit formed by a 100K resistor 58 and diodes 60 and 62. The clamping circuit ensures that no voltages is applied to the threshold comparator which is greater than 600 millivolts, but it also allows low voltages, say of 150 millivolts, to pass without being affected. The clamping circuit prevents the threshold comparator from being damaged by high voltages. It will be appreciated that another sampler identical to the first sampler is utilized to take samples from the second battery i.e. battery B.

In this circuit, two filter mechanisms are used in a sampler. The first filter is formed by the 1K resistor 56 and the sampling capacitor 50. The second filter is formed by the sampling capacitor 50 being switched, since the capacitor once switched from the car battery can no longer carry a noise voltage. These two mechanisms eliminate the high voltage spikes associated with car electrical systems which would make it impossible for the sampler to accurately measure voltages as low as 150 millivolts.

Threshold comparator 66 measures the sampled voltage and determines whether the voltage is positive or negative and whether it is greater than 150 millivolts. If the voltage is greater than 150 millivolts, then it meets the minimum requirement for a chargeable battery which means that the battery is not reversed charged and either the positive or negative, but not both, outputs of the threshold comparators will be asserted. The outputs are evaluated by the sequencer to be described during the "A" and "B" sample cycles and when compared to see if these batteries "A" and "B" are the same or different with respect to polarity.

Initially, none of the batteries are connected to a car battery and no power is applied to the control electronics. The cables are then applied to a battery. If the battery has a voltage of less than 10 volts, the +5 volt regulator and power-up timer will prevent the sequencer from starting. If the battery has a voltage of 10 volts or greater, the 5 volt regulator will turn on and the power-up timer will wait for one second to wait for stable power and then allow the sequencer to start. A clock circuit, which is approximately operating at 15 Hertz, causes the sequencer to step through its algorithm. Each event takes sixty milliseconds which allows the sampling relay contact bounce to settle for a stable voltage measurement.

First the sequencer causes the sampler to take a sample of battery "A". Then the sequencer causes the sampler to take a sample of battery "B" while feeding sample A to threshold comparator 66. The threshold comparator compares the result and determines if the voltage is high enough, and if so, sends the correct polarity information to the sequencer. The sequencer saves the "A" information, positive/negative/or neither, in an internal register. The sequencer than samples battery "B". The sequencer then compares the "B" information from the threshold comparator with the saved value from "A" and determines if "A" and "B" are of the same or different polarities. If the "A" and "B" values are the same, that is they are both positive or both negative, the sequencer turns on the forward main relays. If the "A" and "B" values are different, that is, one is positive and the other is negative, the sequencer turns on the reverse main relays. In either case, the main relays connect the two car batteries together. Note that the high current spark associated with normal charging occurs inside the main relays and not at the batteries. This helps to prevent the possibility of explosion which is a subject safety feature.

After the main connection, sequencer 72 and sampler 48 continue to sample both batteries to see if a clamp has been disconnected from one or both of the batteries. If a clamp is disconnected, the sample voltage will be less than the minimum 150 millivolts; in one embodiment, and the threshold comparator will inform the sequencer to stop. The sequencer then turns off the main relays in such a case. The process then starts all over again as long as a battery with greater than 10 volts is connected to the system.

The subject system has been described in terms of certain battery voltages, i.e. 150 millivolts and 10 volts as being the point at which the system will operate, although it will be appreciated that other voltages are indeed possible depending on the design criteria.

With respect to FIG. 6, one embodiment of the circuitry of FIG. 2B is shown in which the circuitry is grouped according to the blocks to which they correspond. When viewed in conjunction with FIG. 2B, as well as FIGS. 4 and 5 and the description herein, no further description is deemed necessary, as the schematic diagram of FIG. 6 is deemed self-explanatory.

Figure 7:
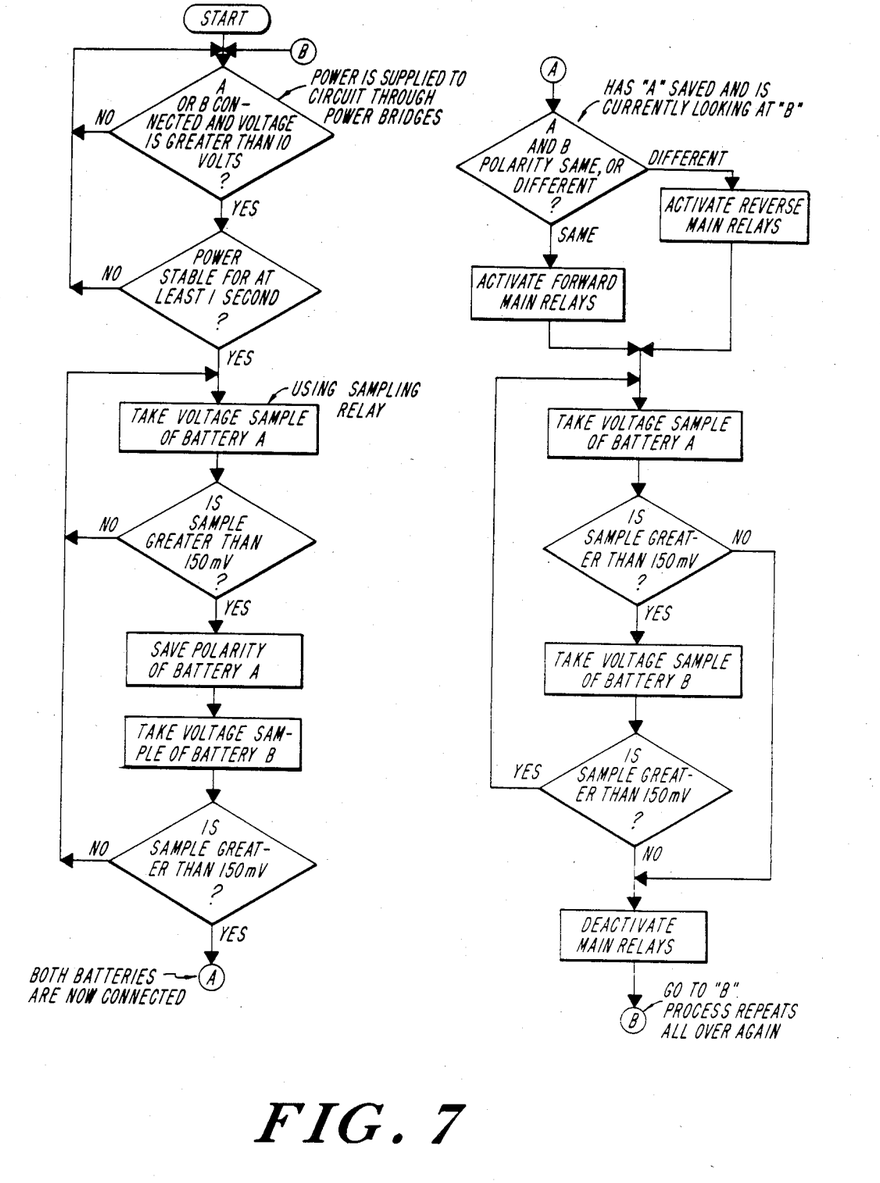
FIG. 7 is a flowchart for the sequencer logic which explains the sequence of events for the sequencing of to FIG. 2B and FIG. 6 sequencer.

FIG. 7 shows the flowchart for the algorithm used by the sequencer which is comprised of a programmable logic array PAL16R8 manufactured by Monolithic Memories Inc. of Santa Clara, Calif.

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. Anti-spark jumper cable apparatus for automatically inter-connecting batteries via sets of battery cables, each set adapted to be connected to the terminals of a battery comprising:

means coupled to said battery cables for automatically sensing the polarity of the voltages delivered by said batteries at their respective terminals and for automatically connecting said battery cables together such that the positive and negative terminals of said batteries are connected together and further including means for sensing the disconnection of a battery cable from a respective terminal and for inhibiting said connecting means for connecting together said sets of cables responsive to the sensing of said disconnection, said disconnection sensing means including cable clamps at the ends of each battery cable, each having a pair of electrically conductive jaws with each jaw having at least one conductor coupled thereto and further including means for separating the jaws of each of said clamps by a distance less than that of a diameter of a battery terminal, thereby to prevent electrical contact between the jaws of a clamp, wherein said polarity sensing means includes sense jaws and means coupled to the sense jaws associated with the battery terminals of first one battery, and then to the sense jaws associated with the battery terminals of the other of said batteries for peridically sensing the polarity of the output voltage from one battery and then the other, means for comparing the sensed polarities, and means for setting said connecting means responsive to whether the sensed polarities are the same or different.

2. Anti-spark jumper cable apparatus for automatically interconnecting batteries via sets of battery cables, each set adapted to be connected to the terminals of a battery comprising:

means coupled to said battery cables for automatically sensing the polarity of the voltages delivered by said batteries at the respective terminals and for automatically connecting said battery cables together such that the respective positive and negative terminals of said batteries are connected together, said battery polarity sensing means including means for periodically sensing the polarity of the output voltage from one battery and then the other, means for comparing the sensed polarities and means for setting said connecting means responsive to whether the sensed polarities are the same or different.

3. The apparatus of claim 2 wherein said periodic sensing means includes a capacitor and means for alternately coupling said capacitor across one set of battery terminals and then the other, with the polarity sensing occurring at the time said capacitor is disconnected from one set of battery terminals and then connected to the other set of battery terminals.

4. The apparatus of claim 3 wherein said periodic sensing means includes a resistor with said capacitor, a DPDT relay for alternatively connecting said capacitor to different sets of battery terminals and comparitor means for determining polarity, said comparitor means having as one input thereto the charge on said capacitor.

5. Anti-spark jumper cable apparatus for automatically interconnecting batteries via sets of battery cables, each set adapted to be connected to the terminals of a battery comprising:

means coupled to said battery cables for automatically sensing the polarity of the voltage delivered by said batteries at their respective terminals and for automatically connecting said battery cables together such that the respective positive and negative cables of said batteries are connected together; and further including means for sensing the disconnection of a battery cable from a respective terminal and for inhibiting said connecting means for connecting together sets of cables responsive to the sensing of said disconnection, said disconnection sensing means including cable clamps at the end of each battery cable, each having a pair of electrically conductive jaws with each jaw having at least one conductor coupled thereto and further including means for separating the jaws of said clamps by a distance less than that of the diameter of a battery terminal thereby to prevent electrical contact between the jaws of a clamp when not clamped to a battery terminal, said battery sensing means including means coupled to the sense jaws associated with the battery terminals of first one battery, then to the sense jaws associated with the battery terminals of the other of said batteries for periodically sensing the polarity of the output voltage from one battery and then the other, said periodic battery polarity sensing means also including means for comparing the sensed polarities, and means for setting said connecting means responsive to the sensed polarities.

6. The apparatus of claim 5 wherein said periodic sensing means includes a capacitor and means for alternately coupling said capacitor across one set of battery terminals and then the other with the polarity sensing occurring at the time that the capacitor is disconnected from one set of battery terminals and then connected to the other set of battery terminals.

* * * * *